United States Patent
Tuttle et al.

(10) Patent No.: US 10,309,858 B2
(45) Date of Patent: Jun. 4, 2019

(54) QUICK TEST SUB COILED TUBING CONNECTOR

(71) Applicant: BAKER HUGHES INCORPORATED, Houston, TX (US)

(72) Inventors: Elliott David Tuttle, Anchorage, AK (US); Christopher Sean Lavoie, Murrieta, CA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 197 days.

(21) Appl. No.: 15/227,402

(22) Filed: Aug. 3, 2016

(65) Prior Publication Data

US 2018/0038763 A1    Feb. 8, 2018

(51) Int. Cl.
*G01M 3/04* (2006.01)
*E21B 17/02* (2006.01)
*E21B 17/20* (2006.01)

(52) U.S. Cl.
CPC ............... *G01M 3/04* (2013.01); *E21B 17/02* (2013.01); *E21B 17/20* (2013.01)

(58) Field of Classification Search
CPC ........... G01M 3/04; E21B 17/02; E21B 17/20
See application file for complete search history.

(56) References Cited

U.S. PATENT DOCUMENTS

| | | |
|---|---|---|
| 4,220,176 A | 9/1980 | Russell |
| 4,373,380 A | 2/1983 | Mayo |
| 4,578,987 A * | 4/1986 | Mayo ................ G01M 3/2853 73/40.5 R |
| 2006/0196675 A1 | 9/2006 | Patel et al. |
| 2012/0318527 A1 | 12/2012 | Erkol et al. |

FOREIGN PATENT DOCUMENTS

EP    2942476 A1    11/2015

OTHER PUBLICATIONS

Hunting Thru-Tubing Tools; Well Intervention Thru-Tubing Product Catalogue v.1.0; In-Situ Test Coil Connection; www.hunting-intl.com.
Korean Intellectual Property Office; International Search Report and Written Opinion; PCT Patent Application No. PCT/US2047/041886; dated Oct. 20, 2017.

* cited by examiner

*Primary Examiner* — David Z Huang
(74) *Attorney, Agent, or Firm* — Parsons Behle & Latimer

(57) ABSTRACT

A test sub having a housing with a first end, a second end, a bore, and an exterior portion of the housing including a coiled tubing connector may be used to test a connection with coiled tubing. The test sub includes a valve positioned within the bore. The second end of the housing may be inserted into coiled tubing and fluid may be pumped into the housing to test the connection between the connector and the coiled tubing. The test sub may be a housing that may be attached to a coiled tubing connector already connected to coiled tubing. A rod within the housing may be moved to an inserted position permitting communication between a pressure port of the housing and an exterior port of the coiled tubing connector. Fluid may be pumped into the pressure port to test the connection between the coiled tubing connector and the coiled tubing.

5 Claims, 4 Drawing Sheets

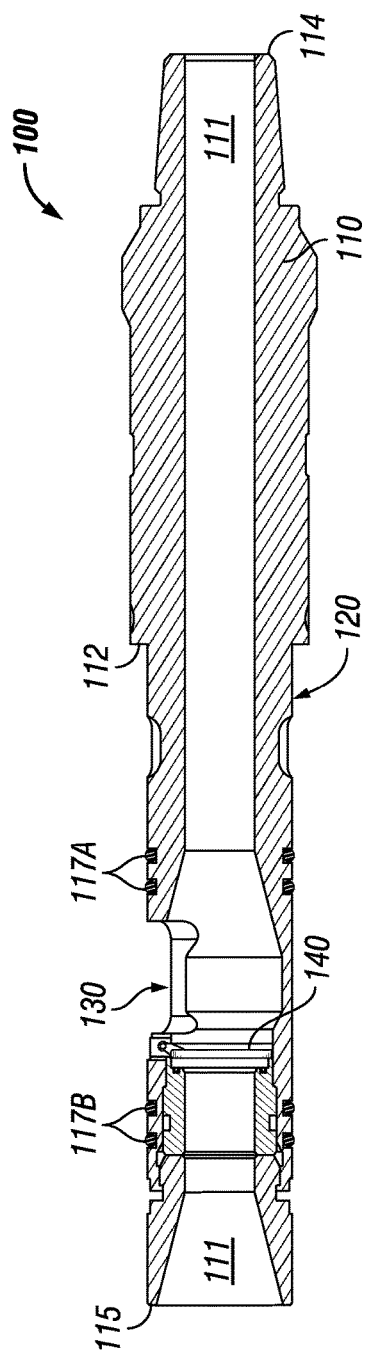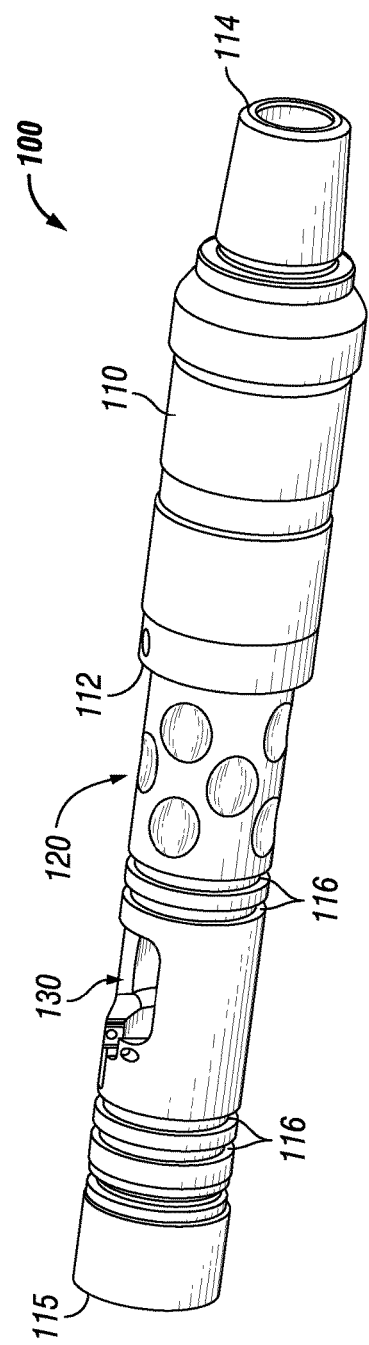
FIG. 1
FIG. 2

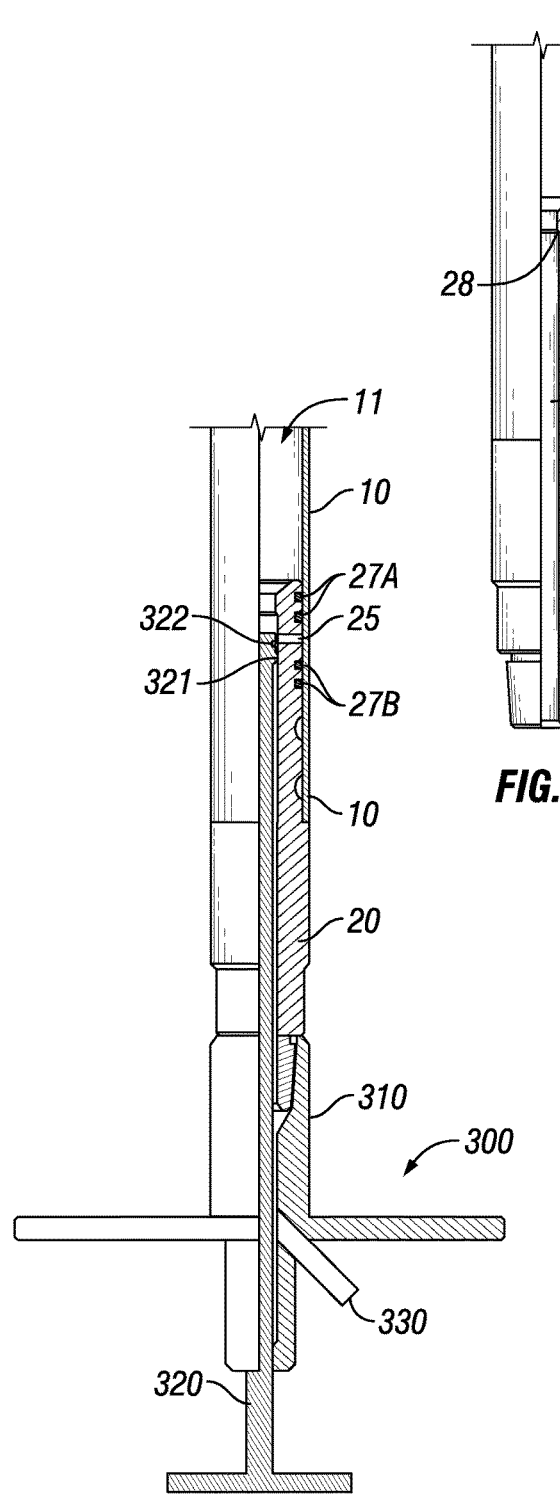
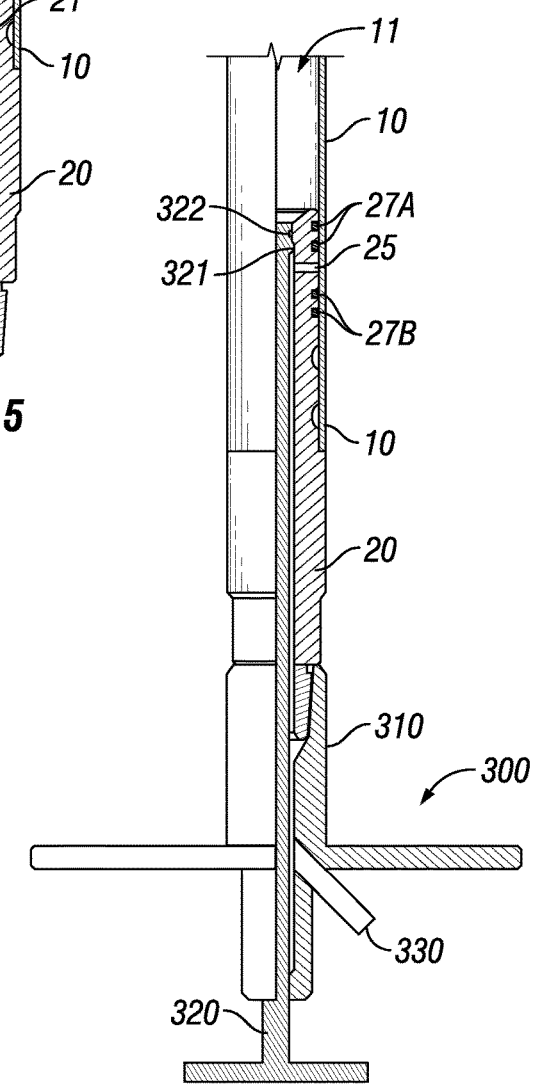
FIG. 5
FIG. 6
FIG. 7

QUICK TEST SUB COILED TUBING CONNECTOR

FIELD OF THE DISCLOSURE

The embodiments described herein relate to a test sub for testing a coiled tubing connector and method of using the test sub.

BACKGROUND

Description of the Related Art

There are present limitations in the oil and gas industry accurately determining whether a coiled tubing connector provides an adequate seal with the coiled tubing to which it is connected. It may be important to pressure test the connection between coiled tubing and a coiled tubing connector to ensure that the connection does not leak when the coiled tubing is pressurized. It may also be important to pressure test the integrity of the tool that is connected to coiled tubing via a coiled tubing connector. Presently, a coiled tubing connector may be pressure tested by filing the entire coiled tubing string with fluid until a desired pressure is reached to ensure that the connection between the coiled tubing and the coiled tubing connector does not leak. Likewise, it is required to fill the entire coiled tubing string with fluid until a desire pressure is reached to pressure test the integrity of a tool connected to the coiled tubing via a coiled tubing connector.

It may be undesirable to fill the entire coiled tubing string to pressure test a coiled tubing connection. Filling the entire coiled tubing string may take a long time depending on the length of the coiled tubing string. A quicker pressure test apparatus and method would be beneficial.

SUMMARY

The present disclosure is directed to quick test sub for coiled tubing connectors and method of use that overcomes some of the problems and disadvantages discussed above.

One embodiment is a coiled tubing connector test sub comprising a housing having a first end, a second end, and a bore, an exterior portion of the housing includes a coiled tubing connector. The test sub comprises a first valve positioned within the bore of the housing. The second end of the housing may be inserted into coiled tubing and fluid may be pumped into the bore between the first end of the housing and the first valve to test a connection between the housing and coiled tubing.

The first valve of the housing may be a flapper valve. The housing may include an opening that permits communication between an exterior of the housing and the bore, the opening being positioned between a first seal positioned on the exterior of the housing and a second seal positioned on the exterior of the housing. The first valve may be positioned between the opening and the second end of the housing. The first valve may prevent flow in the bore past the first valve in a direction from the opening to the second end of the housing. The fluid may be pumped into the bore from the first end of the housing. The first seal positioned on the exterior of the housing may comprise two o-rings and the second seal positioned on the exterior of the housing may also comprise two o-rings.

The test sub may include an exterior port positioned between the coiled tubing connector and the first end of the housing, the exterior port may permit the pumping of fluid into the bore of the housing. The test sub may include a test plate connected to the first end of the housing, the test plate may include a test valve in communication with the bore of the housing that permits the monitoring of pressure within the bore of the housing. The test sub may include at least one seal on an exterior the housing, the at least one exterior seal being positioned between the coiled tubing connector and the first valve, wherein the first valve prevents fluid flow form the bore of the housing out the second end of the housing. The test sub may include a second valve and a third valve each positioned within the bore between the first end of the housing and the exterior port, the second and third valves configured to prevent flow within the bore in a direction from the first end of the housing towards the second end of the housing.

One embodiment is a method of pressure testing a connection between coiled tubing and a coiled tubing connector comprising connecting a housing to coiled tubing with a coiled tubing connector and pumping fluid into the housing. The method comprises closing a valve within a bore of the housing to prevent fluid flow out of the bore of the housing into the coiled tubing and detecting whether fluid leaks out of the connection between the coiled tubing and the housing.

Connecting the housing to coiled tubing may comprise inserting a second end of the housing into the coiled tubing, the coiled tubing may cover an opening in the housing and engage a first sealing element positioned between the opening and a first end of the housing. The coiled tubing may also engage a second sealing element positioned between the opening and the second end of the housing. Pumping fluid into the housing may comprise pumping fluid into the first end of the housing wherein the valve is positioned between the opening and the second end of the housing.

One embodiment is a system to check a connection between coiled tubing and a coiled tubing connector comprising a coiled tubing connector configured to connect to coiled tubing, the coiled tubing connector having a bore, a first sealing element, a second sealing element, and an exterior port in communication with the bore, the exterior port being positioned between the first sealing element and the second sealing element. The system comprises a housing configured to be sealingly attached to an end of the coiled tubing connector, the housing including a bore in communication with the bore of the coiled tubing connector when attached, a moveable rod positioned within the bore of the housing, and a pressure port in communication with the bore of the housing. The movable rod being configured to extend into the bore of the coiled tubing connector, the rod being movable from an extended position to an inserted position. A seal at an end of the rod engages the bore of the coiled tubing connector, wherein in the extended position the seal at the end of the rod prevents communication from the pressure port of the housing to the exterior port of the coiled tubing connector and wherein in the inserted positioned the seal at the end of the rod permits communication between the pressure port of the housing and the exterior port of the coiled tubing connector.

The coiled tubing connector of the system may include a stop within the bore that prevents movement of the rod past the inserted position. The first sealing element of the system may comprise a plurality of sealing elements and the second sealing element of the system may also comprise a plurality of sealing elements.

One embodiment is a method of checking a connection between coiled tubing and a coiled tubing connector comprising connecting a coiled tubing connector to coiled tubing and connecting a housing to the coiled tubing connector. The method comprises moving a rod within a bore of the housing from an extended position to an inserted position, pumping fluid into the housing via a pressure port, and detecting leaks between the coiled tubing connector and the coiled tubing. The movement of the rod form the extended position to the inserted position may permit communication from a pressure port of the housing to an exterior port of the coiled tubing connector. The exterior port of the coiled tubing connector may be positioned between a plurality of sealing element.

BRIEF DESCRIPTION OF THE DRAWINGS

FIG. 1 shows a cross section of an embodiment of test sub for testing a coiled tubing connector.

FIG. 2 shows a perspective view of the test sub of FIG. 1.

FIG. 5 shows a cross section of an embodiment of a coiled tubing connector connected to coiled tubing.

FIG. 6 shows a cross section of an embodiment of a test sub connected to a coiled tubing connector and coiled tubing.

FIG. 7 shows a cross section of the test sub of FIG. 6 with a plug rod positioned to permit testing of the connection between the coiled tubing connector and the coiled tubing.

Figure 3:
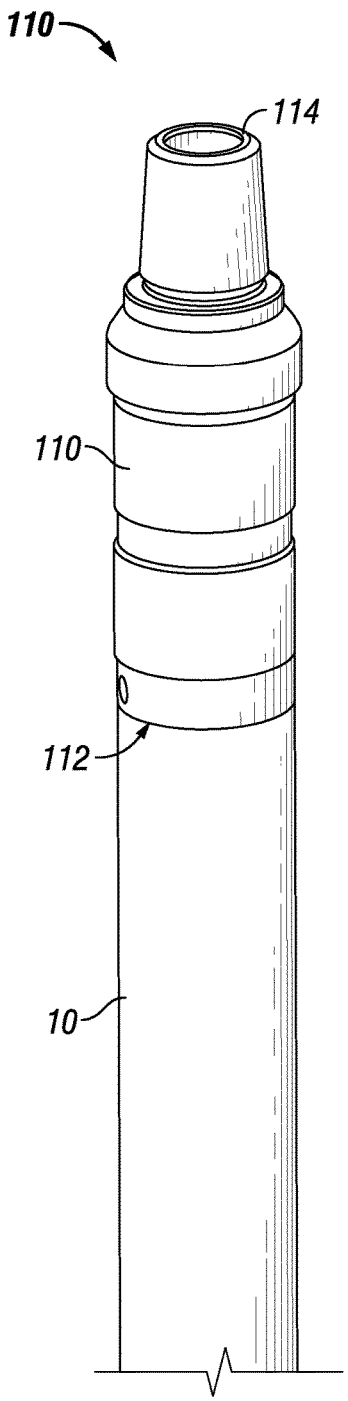
FIG. 3 shows a perspective view of coiled tubing connected to the test sub of FIG. 2.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 shows one embodiment of a test quick sub 100, also known as a motorhead, hereinafter referred to as a test sub 100. The test sub 100 includes a housing 110 having a bore 111 that runs the length of the housing 110. The housing 110 includes a first end 114 and a second end 115. The second end 115 of the housing 110 is adapted to be inserted into an end of coiled tubing 10 (shown in FIG. 3). An exterior portion of the housing 110 includes a coiled tubing connector 120. FIG. 2 is a perspective view of the test quick sub 100 and shows the coiled tubing connector 120 as a dimple connector for illustrative purposes only. Various types of coiled tubing connectors may be used in the disclosed apparatus, systems, and methods as would be appreciated by one of ordinary skill in the art having the benefit of this disclosure. For example, the coiled tubing connector may be a dimple on, slip type, j-lock, or roll on connector, but is not limited to these examples. As used herein, "coiled tubing connector" is any connector used to connect an object to a coiled tubing string.

The housing 110 of the test sub 100 includes a plurality of exterior sealing elements shown in FIG. 1 as a first set of sealing elements 117A and a second set of sealing elements 117B referred to collectively as sealing elements 117. The exterior sealing elements 117 are located in exterior grooves 116 of the housing 110 as shown in FIG. 2. The first sealing element 117A is shown as two o-rings positioned within grooves 116 and the second sealing element 117B is shown as two o-rings positioned within grooves 116 for illustrative purposes only. The number, configuration, location, and size of the sealing elements 117 may be varied within the scope of this disclosure as would be appreciated by one or ordinary skill in the art having the benefit of this disclosure.

The housing 110 includes a window or opening 130 that is positioned between a first set of sealing elements 117A and a second set of sealing elements 117B. The test sub 100 includes a valve 140 that is positioned within the bore 111 of the housing 110. The valve 140 is located between the opening 130 and the second end 115 of the housing. The valve 140 is configured to prevent fluid from flowing past the valve in the direction towards the second end 115 and may be, for example, a flapper valve. FIG. 1 shows the valve 140 in the closed position preventing fluid past the valve 140 to the second end 115 of the housing 110.

The second end 115 of the housing 110 is configured to be inserted into coiled tubing 10 as shown in FIG. 3. The housing 110 includes an exterior shoulder 112 that engages the end of the coiled tubing 10 when the second end 115 is fully inserted into the coiled tubing 10. The coiled tubing connector 120 (shown in FIG. 2 and FIG. 3) will secure the test sub 100 to the coiled tubing 10. Once the test sub 100 is connected to coiled tubing 10, fluid may be pumped into the bore 111 of the housing 110 via the first end 114 of the housing 110. The fluid will travel along the bore 111 of the housing 110 until it is diverted out of the opening 130 of the housing 110 due to the closed valve 140. The first sealing elements 117A and the second sealing elements 117B will engage the coiled tubing 10 and create a seal on both sides of the opening 130. Once the bore 111 of the housing 100 is pressurized to a desired pressure the connection between the test sub 100 and the coiled tubing 10 may be observed to detect whether any fluid leaks exist. The test sub 100 may be used to pressure test the connection between the test sub 100 and coiled tubing 10 without filling the entire coiled tubing string 10, but rather only pressurizing the bore of the test sub 100. Likewise, the test sub 100 itself may be pressure tested.

Figure 4:
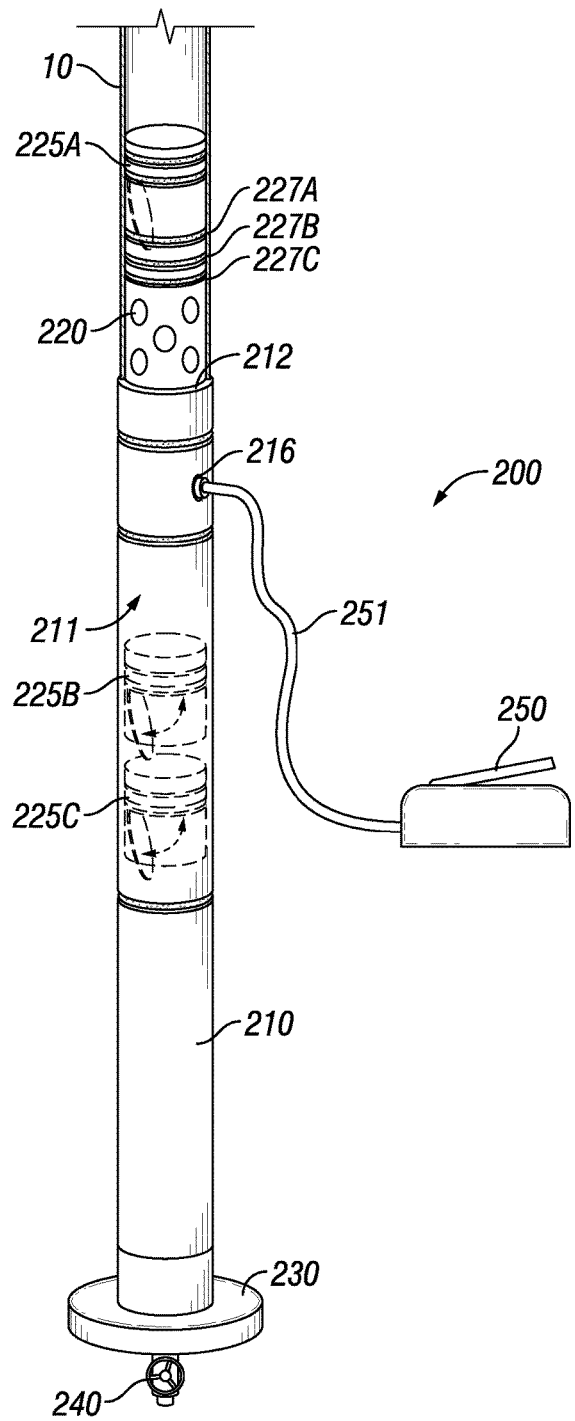
FIG. 4 shows a schematic of one embodiment of a test sub for testing a coiled tubing connector.

FIG. 4 shows another embodiment of a test sub 200 that may be used to pressure test a connection with coiled tubing 10 without filling up the entire coiled tubing string 10. The test sub 200 includes a housing 210 that includes a bore 211. A first flapper valve 225A is located within the bore 211 of the housing 210 adjacent a first end of the housing and a test plate 230 including a valve 240 is attached to the second end of the housing 210. The first flapper valve 225A is configured to prevent fluid from flowing out of the test sub 200 and into the coiled tubing string 10. The first flapper valve 225A permits the test sub 200 to be pressure tested without filling up the entire coiled tubing string 10. The first end of the housing 210 may be inserted into coiled tubing 10 with a shoulder 212 on the housing 210 engaging the end of the coiled tubing 10. The test sub 200 may be connected to the coiled tubing 10 via a coiled tubing connector 220 located towards the first end of the housing 210. Various coiled tubing connectors 220 may be used with the test sub 200 as would be appreciated by one of ordinary skill in the art having the benefit of this disclosure.

The test sub 200 includes a plurality of sealing elements 227A, 227B, and 227C to create a seal between the housing 210 and the coiled tubing 10. The number, location, and configuration of the sealing elements 227A, 227B, and 227C is shown for illustrative purposes only and may be varied as would be appreciated by one of ordinary skill in the art having the benefit of this disclosure. The test sub 200 includes a second flapper valve 225B and a third flapper valve 225C positioned within the bore 211 of the housing. The second and third flapper valves 225B and 225C are positioned between an external port 216 in the housing 210 and the test plate 230 connected to the second end of the housing 210. The second and third flapper valves 225B and 225C are both configured to prevent fluid from flowing past the valves 225B and 225C in the direction from the test plate 230 to the external port 216.

An external pump 250 is connected to the external port 216 via a communication line 251. The external pump 250 may be used to pressurize the bore 211 of the test sub 210. As discussed above, the first flapper valve 225A prevents fluid flow into the coiled tubing 10 and limits the pressure test to filling the bore 211 of the housing 210. The pressure within the bore 211 of the housing 210 may be monitored via valve 240 in the test plate 230 located at the second end of the housing 210. The first, second, and third flapper valves 225A, 225B, and 225C are shown for illustrative purposes any may be any valve configured to selectively permit fluid flow in a first direction while preventing flow in a second direction as would be appreciated by one of ordinary skill in the art having the benefit of this disclosure.

FIG. 6 and FIG. 7 shows another embodiment of a test sub 300 that may be used to pressure test a connection between a coiled tubing connector 20 and coiled tubing 10. FIG. 5 shows a coiled tubing connector 20 inserted into and connected to coiled tubing 10. The coiled tubing connector 20 includes a bore 21 that is in communication with the bore 11 of the coiled tubing 10. The coiled tubing connector 20 includes an exterior port 25 that is in communication with the bore 21 of the coiled tubing connector 20. The exterior of the coiled tubing connector includes a first sealing element 27A and a second sealing element 27B, collectively referred to as sealing elements 27, located on either side of the exterior port 25. As shown in FIG. 5, the first sealing element 27A may be comprised of a plurality of sealing elements. Likewise, the second sealing element 27B may be comprised of a plurality of sealing elements. The exterior sealing elements 27 create a seal between the coiled tubing connector 20 and the coiled tubing 10.

FIG. 6 shows a test sub 300 sealingly attached to the end of the coiled tubing connector 20. The test sub 300 includes a housing 310 that includes a rod 320 positioned within a bore of the housing 310. The housing 310 includes a pressure port 330 that permits communication with the bore of the housing 310, which is in communication with the bore 21 of the coiled tubing connector 20. When the test sub 300 is attached to the coiled tubing connector 20 an end 321 of the rod 320 extends into the bore 21 of the coiled tubing connector 20. A sealing element 322 located at the end 321 of the rod 320 prevents communication between the pressure port 330 of the test sub 300 and the exterior port 25 of the coiled tubing connector 20 when the rod 320 is in an initial or extended position as shown in FIG. 6.

The rod 320 of the test sub 300 may be pushed in to permit communication between the pressure port 330 of the test sub 300 and the exterior port 25 of the coiled tubing connector 20. FIG. 7 shows the test sub 300 with the rod 320 in an inserted or testing position. The rod 320 has been pushed or inserted farther into the bore 21 of the coiled tubing connector 20 so that the sealing element 322 at the end 321 of the rod 320 is pushed past the exterior port 25 of the coiled tubing connector 20. In this position, the sealing element 322 permits communication between the pressure port 330 and the exterior port 25, but will create a seal with the coiled tubing connector 20 to prevent fluid from flowing out of the bore 21 of the coiled tubing connector 20 and into the bore 11 of the coiled tubing 10. The exterior port 25 permits the pressure testing of the connection between the coiled tubing connector 20 and the coiled tubing 10, which is sealed via the first and second sealing elements 27A and 27B. The coiled tubing connector 20 may include a stop of shoulder 28 that prevents the inward movement of the end 321 of the rod 320 to ensure that the sealing element 322 creates a seal with the coiled tubing connector 20. The pressure within the bore 21 of the coiled tubing connector 20 may be monitored via the pressure port 330 and once the desired pressure is achieved with no leaks detected the test sub 300 may be removed from the coiled tubing connector 20.

Figure 8:
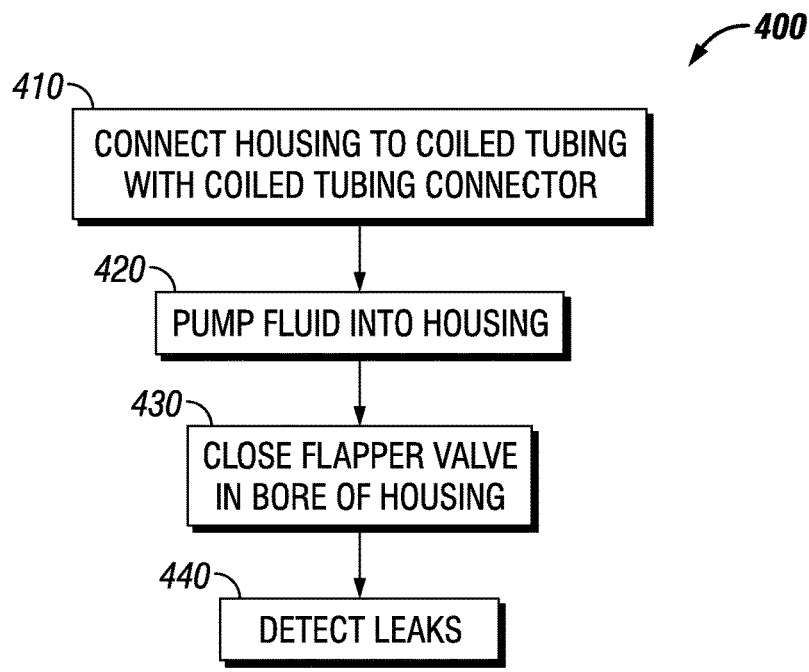
FIG. 8 shows a flow chart of one embodiment of a method to pressure check a coiled tubing connection.

FIG. 8 is a flow chart for one embodiment of a method of pressure testing a connection between coiled tubing and a coiled tubing 400. The first step 410 of the method 400 is connecting a housing to coiled tubing via a coiled tubing connector. Fluid may then be pumped into the housing in step 420. A flapper valve located within the bore of the housing is then closed in step 430 to limit the fluid to the bore of the housing rather than filling up the entire coiled tubing string. A flapper valve is used for illustrative purposes only. Any valve that may be closed to prevent fluid from filling up the entire coiled tubing string may be used as would be appreciated by one of ordinary skill in the art having the benefit of this disclosure. Once the bore of the housing is pressurized to a desired pressure, leaks between the coiled tubing connector and the coiled tubing may possibly be detected in step 440.

Figure 9:
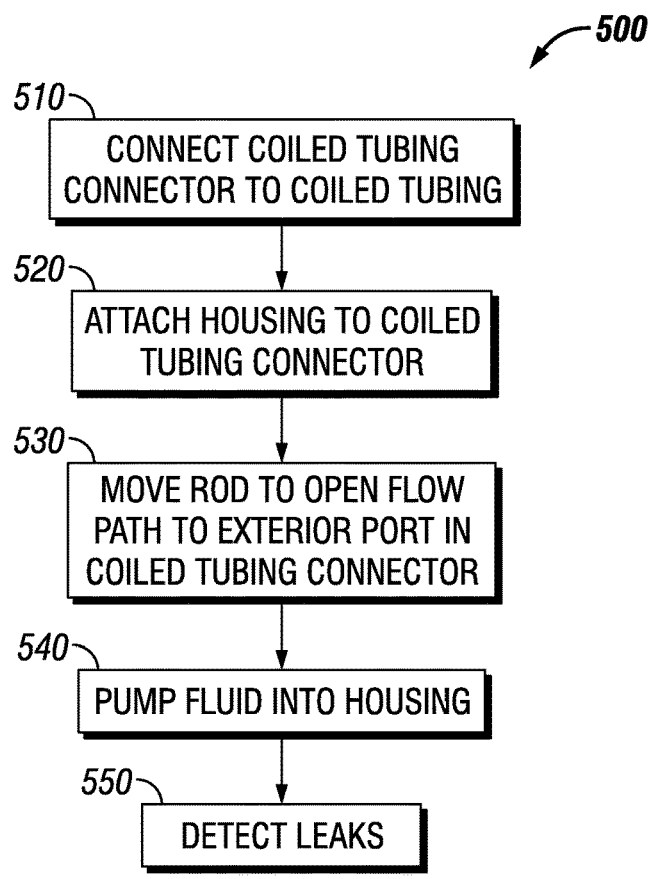
FIG. 9 shows a flow chart of one embodiment of a method to pressure check a coiled tubing connection.

FIG. 9 is a flow chart for one embodiment of a method of pressure testing a connection between coiled tubing and a coiled tubing 500. The first step 510 of the method 500 is to connect a coiled tubing connector to coiled tubing. The next step 520 of the method 500 is attaching a housing to the coiled tubing connector. A rod within the housing may be moved to open a flow path to an exterior port in the coiled tubing connector in step 530 and fluid may then be pumped into the housing in step 540. Once the bore of the housing is pressurized to a desired pressure, leaks between the coiled tubing connector and the coiled tubing may possibly be detected in step 550.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A system to check a connection between coiled tubing and a coiled tubing connector comprising:
   the coiled tubing connector configured to connect to coiled tubing, the coiled tubing connector having a bore, a first sealing element, a second sealing element, and an exterior port in communication with the bore, the exterior port being positioned between the first sealing element and the second sealing element;
   a housing configured to be sealingly attached to an end of the coiled tubing connector, the housing including a bore in communication with the bore of the coiled tubing connector when attached, a movable rod positioned within the bore of the housing, and a pressure port in communication with the bore of the housing;

wherein the moveable rod is configured to extend into the bore of the coiled tubing connector, the rod being movable from an extended position to an inserted position;

wherein a seal at an end of the rod engages the bore of the coiled tubing connector;

wherein in the extended position the seal at the end of the rod prevents communication from the pressure port of the housing to the exterior port of the coiled tubing connector; and wherein in the inserted position the seal at the end of the rod permits communication between the pressure port of the housing and the exterior port of the coiled tubing connector.

2. The system of claim 1, wherein the coiled tubing connector further comprises a stop within the bore of the coiled tubing connector that prevents movement of the rod past the inserted position.

3. The system of claim 1, wherein the first sealing element further comprises a first plurality of sealing elements and wherein the second sealing element further comprises a second plurality of sealing elements.

4. A method of checking a connection between coiled tubing and a coiled tubing connector comprising:
   connecting the coiled tubing connector to coiled tubing;
   connecting a housing to the coiled tubing connector;
   moving a rod within a bore of the housing from an extended position to an inserted position;
   pumping fluid into the housing via a pressure port in the housing; and
   detecting leaks between the coiled tubing connector and the coiled tubing,
   wherein the movement of the rod from the extended position to the inserted position permits communication from the pressure port in the housing to an exterior port of the coiled tubing connector.

5. The system of claim 4, wherein the exterior port of the coiled tubing connector is positioned between a plurality of a sealing elements.

* * * * *